Jan. 3, 1928.
H. E. ALTGELT
1,655,351
HITCH OR CLEVIS STRUCTURE
Filed Dec. 29, 1924
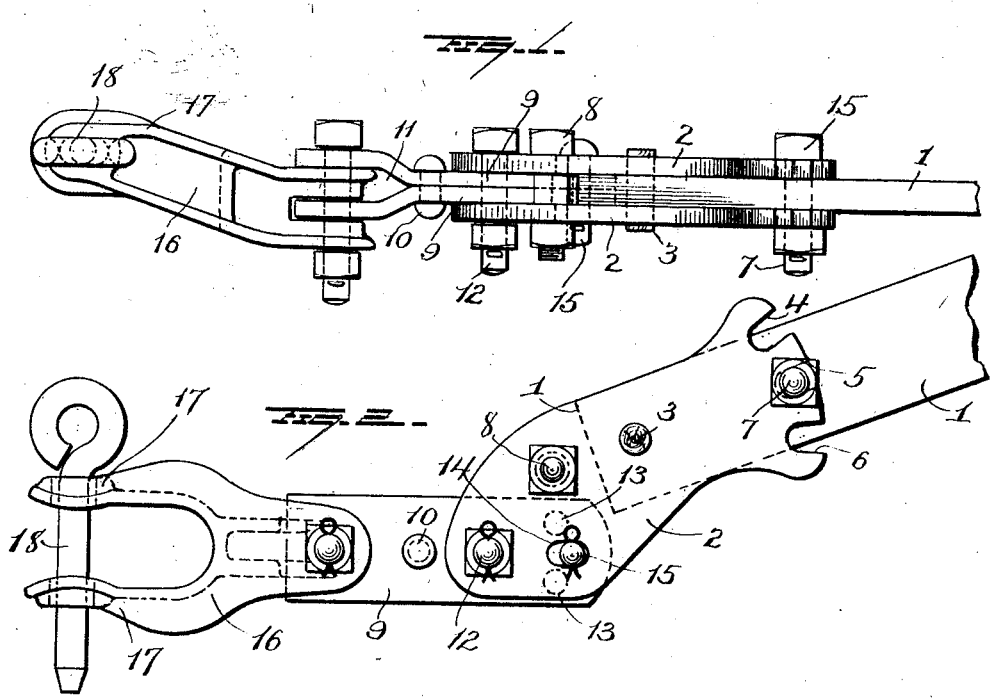
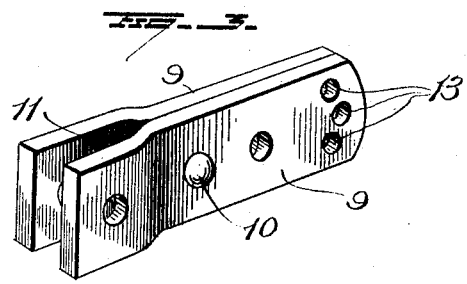
Inventor
H. E. Altgelt
By Seymour & Bright
Attorneys Patented Jan. 3, 1928.

1,655,351

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

HITCH OR CLEVIS STRUCTURE.

Application filed December 29, 1924. Serial No. 758,694.

This invention relates to improvements in hitch or clevis structures for tractor-drawn plows,—one object of the invention being to provide such a structure in which fine vertical adjustments can be effected.

A further object is to so construct hitch or clevis devices that they may be made substantially rigid when the plow on which they are used is working in hard ground and thus aid in causing penetration of the plow base or bases, and so that the said hitch devices may be rendered flexible when the plow is working in uneven ground and across ditches and high places so that the plow will be permitted to make furrows of even depth while the tractor hitch or point of attachment of the clevis or hitch devices with the tractor, moves up and down.

A further object is to provide a hitch or clevis structure which shall embody simplicity of construction and efficiency of operation.

With these and other objects in view, the invention consists in certain novel features of construction and combinations of parts as hereinafter set forth and pointed out in the claims.

In the accompanying drawings,—

Figure 1 is a plan view of a hitch or clevis structure embodying my improvements.

Figure 2 is a side elevation, and

Figure 3 is a detail view.

In the drawings I have represented a portion of a plow frame at 1 and to this, two parallel clevis plates 2 are connected by means of a pin 3 which is preferably a wooden break pin but which may, if desired, be replaced by a metal pin or bolt. The clevis plates 2 receive the frame member 1 between them and each of said plates is provided at one end with a plurality of notches 4, 5, 6, for the accommodation of a bolt 7 which passes through the frame member 1 and thus the clevis plates 2 may be adjusted vertically with relation to the frame member 1. If desired a securing bolt 8 may be passed through the clevis plates and a suitable spacing sleeve located on said bolt.

The clevis plates 2 are diagonally disposed and between their lower forward end portions, a link 9 enters. This link 9 preferably comprises two members secured together by a rivet 10 located intermediate their ends and the forward ends of the link members are spread apart whereby a bifurcated portion 11 is provided at the forward end of the link. A pin 12 passes through the lower forward portions of the clevis plates 2 and through an intermediate portion of the link 9, thus pivotally connecting the latter with the clevis plates. The rear portion of the link 9 is provided with a plurality of holes 13 (three such holes being shown in the drawings) and the clevis plates are provided with elongated slots 14, through which and any one of the holes 13, a pin 15 passes.

A clevis 16 is pivotally connected with the bifurcated forward end portion of the link 9 and this clevis is formed with jaws 17 to receive a part on a tractor, being retained in engagement with such part by means of a pin 18 passing through said jaws.

By means of the adjustable connection of the rear portion of the link 9 with the forward portion of the clevis plates 2, a finer vertical adjustment on the tractor can be obtained than would be possible if the adjustable connection between the clevis plates and the plow frame were solely depended upon.

When the pin 15 connecting the clevis plates 2 and link 9 is employed, as shown in the drawings, the said link and plates will be held together substantially rigid and this of course reduces the flexibility of the hitch or clevis structure. This is desirable when the plow to which my improvements are applied is working in very hard ground, as it aids in causing penetration of the plow base or bases. When plowing in uneven ground and across ditches and high spots, it is desirable that the hitch or clevis structure shall have sufficient flexibility to give the plow a chance to make furrows of even depth while the tractor hitch moves up and down. This may be accomplished by removing the pin 15 and permitting the link to hinge or swing on the bolt 12.

Various slight changes might be made in the details of construction of my invention without departing from the spirit of the latter or limiting its scope and hence I do not restrict myself to the precise details herein set forth.

Having fully described my invention what I claim as new and desire to secure by Letters-Patent, is:

1. A clevis structure comprising clevis plates, means for connecting said plates to a plow frame in downwardly and forwardly projecting relation thereto, a link pivotally supported between its ends by said clevis plates, means for adjustably connecting one end of said link with the clevis plates rearwardly of the pivotal mounting of said link and in advance of the plow frame, and a clevis pivotally connected with the forward end of the link forwardly of the pivotal connection of said link with the clevis plates and adapted for attachment to a tractor.

2. A clevis structure comprising a clevis plate, means pivotally and adjustably connecting said plate with a member to be drawn, a link pivotally connected between its ends to the lower front end of said clevis plate, means for holding said link in any one of a plurality of vertical adjustments, and means pivotally connected with the forward end of the link forwardly of the pivotal connection of the latter with the clevis plates for connecting the structure to a tractor.

3. A clevis structure comprising a clevis plate, means for connecting said plate with a member to be drawn, a link pivoted between its ends to said clevis plate, said link having a vertical series of holes adjacent its rear end, a pin passing through the clevis plate and any one of said holes, said pin being removable whereby the link may be permitted to swing freely on its pivotal connection with the clevis plate, and means pivotally connected with the forward portion of the link forwardly of the pivotal connection of the latter with the clevis plates for connecting said link with a tractor.

4. A clevis structure comprising parallel clevis plates, means for connecting said plates to a member to be drawn, said plates each having a horizontal elongated slot, a link entering between said plates and pivotally connected intermediate its ends therewith, said link having near its rear end a vertical series of holes, a pin to pass through the elongated slots of the clevis plates and through any one of the holes in the link, and a clevis pivotally connected with the forward end portion of said link forwardly of the pivotal connection of the latter with the clevis plates and adapted for attachment to a tractor.

5. A clevis structure comprising a pair of clevis plates, means for attaching said plates to a frame element with their front ends extending downward and forwardly beyond said element, means at the rear ends of the plates for adjusting the same in vertical planes, the plates being each provided near its front extremity with an elongated horizontal opening, a straight link pivoted between the front ends of the plates and extending forwardly and rearwardly from its pivot and provided at its rear end with a vertical series of openings, a fastening pin inserted through the elongated openings in the clevis and any one of the openings in the link, and a draft clevis pivoted at its rear end to the front end of the link.

In testimony whereof, I have signed this specification.

HERMAN E. ALTGELT.